(12) United States Patent
Belkin et al.

(10) Patent No.: US 9,340,142 B1
(45) Date of Patent: May 17, 2016

(54) COVER FOR CARGO LASHING FITTING

(71) Applicant: Peck & Hale, L.L.C., West Sayville, NY (US)

(72) Inventors: Richard Belkin, Bay Shore, NY (US); Jose Diaz-Bujan, Babylon, NY (US)

(73) Assignee: Peck & Hale, L.L.C., West Sayville, NY (US)

( * ) Notice: Subject to any disclaimer, the term of this patent is extended or adjusted under 35 U.S.C. 154(b) by 0 days.

(21) Appl. No.: 14/298,951

(22) Filed: Jun. 8, 2014

Related U.S. Application Data

(60) Provisional application No. 61/833,899, filed on Jun. 11, 2013, provisional application No. 61/846,395, filed on Jul. 15, 2013.

(51) Int. Cl.
*B60P 7/06* (2006.01)
*B60J 11/06* (2006.01)

(52) U.S. Cl.
CPC ... *B60P 7/06* (2013.01); *B60J 11/06* (2013.01)

(58) Field of Classification Search
CPC ..... B60P 7/0807; B63B 25/24; B61D 45/001; B61D 45/00; B61D 17/04; B61D 17/08; B61D 45/007; B62D 21/08; B62D 25/2054; B62D 29/045; B62D 33/02; B62D 33/046; B62D 21/20; B62D 25/02; B62D 25/087; B62D 27/02; B62D 33/0273; B62D 33/04; B62D 33/042

USPC .......... 410/112, 116, 101, 106, 109, 114; 248/499, 205.4, 220.22, 503
See application file for complete search history.

(56) References Cited

U.S. PATENT DOCUMENTS

| | | | |
|---|---|---|---|
| 3,927,623 A | | 12/1975 | Caron |
| 4,400,856 A | * | 8/1983 | Tseng ........................ 24/590.1 |
| 4,457,650 A | * | 7/1984 | Tseng ........................ 410/111 |
| 4,877,361 A | | 10/1989 | DeRosa et al. |
| 5,020,948 A | * | 6/1991 | Ihara ........................... 410/105 |
| 6,641,342 B1 | * | 11/2003 | Girardin ...................... 410/106 |
| 2011/0210227 A1 | * | 9/2011 | Burg et al. .................. 248/499 |

OTHER PUBLICATIONS

Drawing, Cover Assembly for Cloverleaf Vehicle & Helicopter Deck Fittings, 1966.

* cited by examiner

*Primary Examiner* — Glenn Dayoan
*Assistant Examiner* — Sunsurraye Westbrook
(74) *Attorney, Agent, or Firm* — Schroeder Law PC

(57) ABSTRACT

A cover assembly for a cargo lashing fitting having a substantially planar cover plate which can be readily installed/uninstalled to and from the fitting, which connects to the fitting in an impact-resistant manner, which can resist the forces incurred when subjected to loading from on-deck vehicles and equipment, and which provides a long lasting watertight seal of the socket cavity.

22 Claims, 13 Drawing Sheets

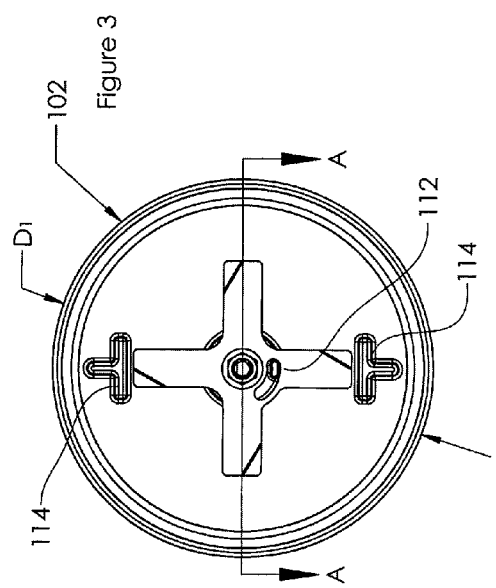
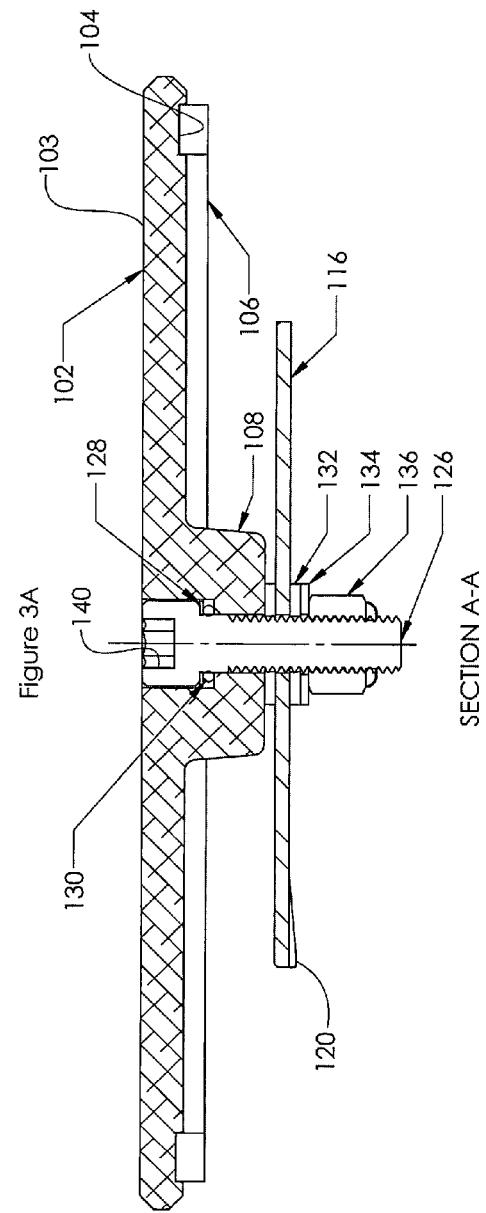

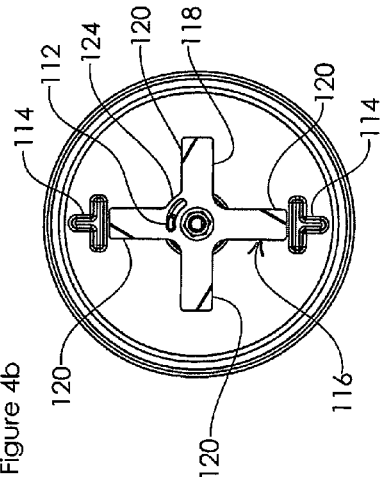
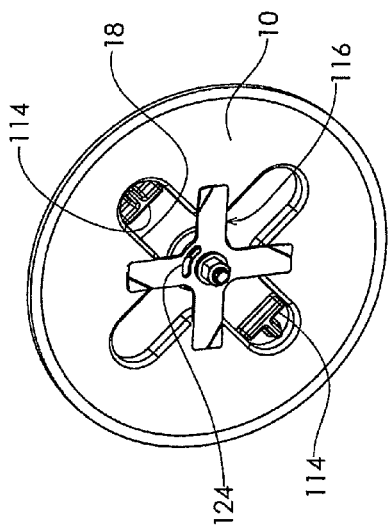
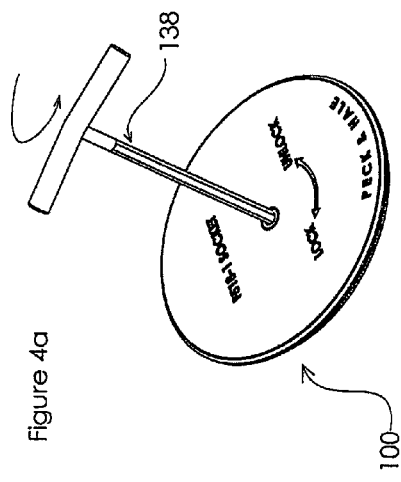
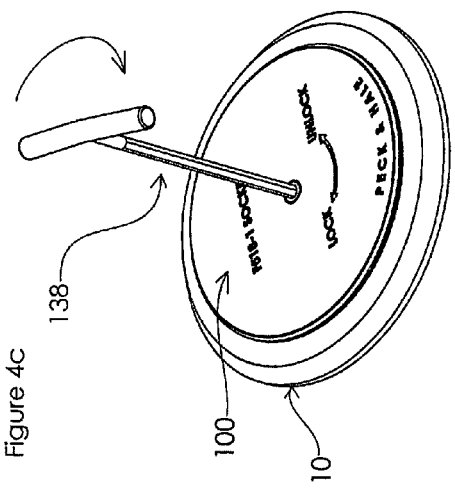

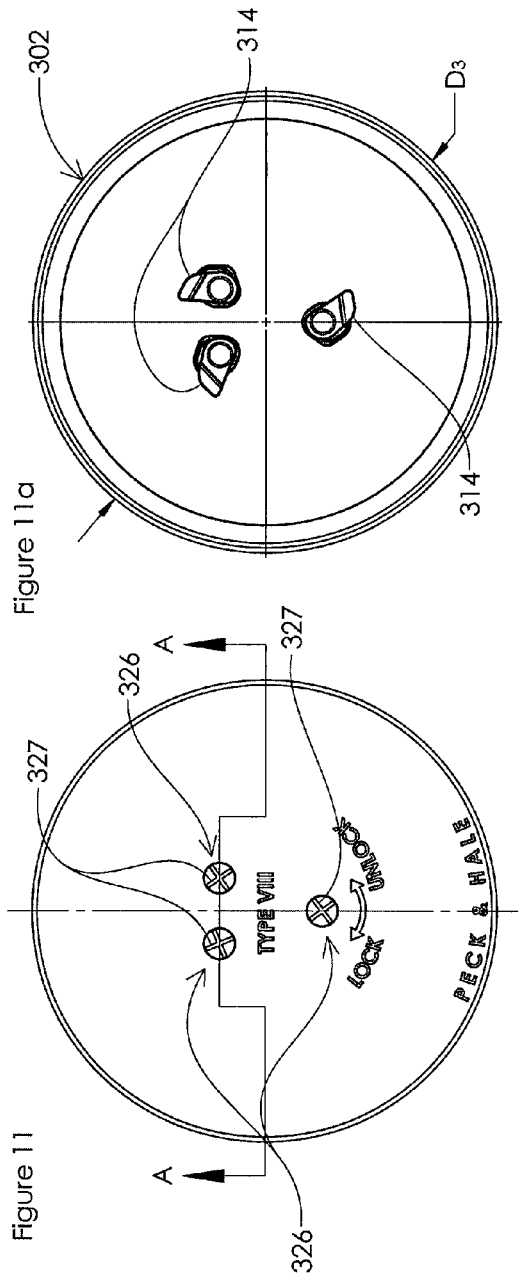
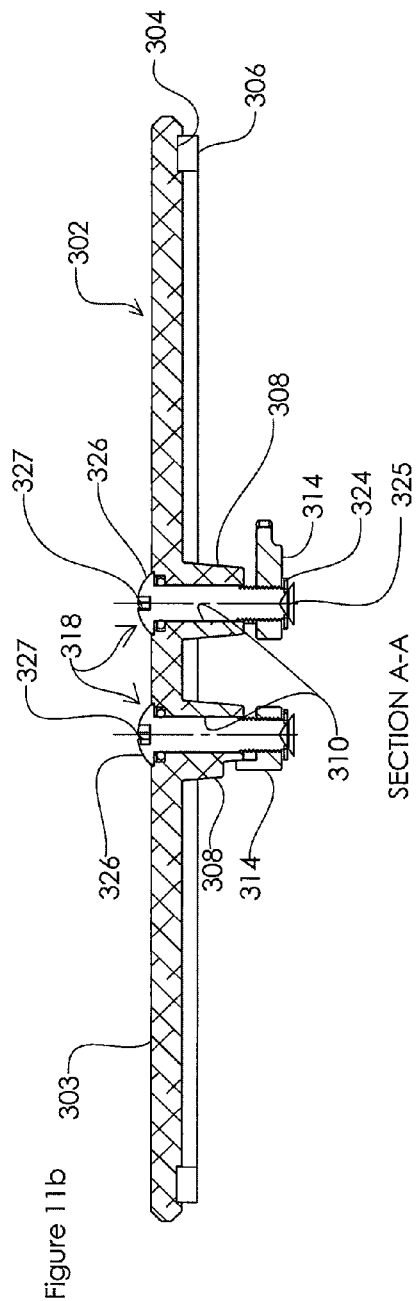

US 9,340,142 B1

COVER FOR CARGO LASHING FITTING

BACKGROUND OF THE INVENTION

The present invention relates to the transportation of cargo and, more particularly, to covers for the cargo lashing fittings that are affixed to the deck of a transportation vehicle.

The transportation of cargo requires securing systems and devices that ensure that such cargo remains safely stowed and stationary during transit. In this regard, the deck of the transportation vehicle, e.g., a ship, railcar, etc, typically includes a plurality of cargo lashing fittings, often referred to as lashing sockets. Common designs of lashing sockets include cloverleaf-type lashing sockets, crossbar-type lashing sockets and 5-bar type lashing sockets. A tiedown assembly, or other such lashing gear, is then installed between an attachment point on the item of cargo and the lashing socket installed in the deck of the vehicle, thereby ensuring that the cargo remains stationary during transport.

It will be recognized by those skilled in the art that lashing sockets provide an open cavity for collection of water and debris. Moreover, in particular applications, an open cavity on the deck of the vehicle may be undesirable. Attempts have been made to provide covers for such lashing sockets, but these prior art covers have been unable to resist ingress of moisture/water and/or have been unable to resist inadvertent removal upon impact or exposure to harsh conditions, including wind and/or high velocity air flow. Other prior art covers have included non-planar cover plates, which tend to collect water/debris thereon, and which may hinder movement of equipment/persons across the surface of the deck when such cover is installed.

There is therefore a need in the art for a cover for a cargo lashing fitting which can be readily installed/uninstalled to and from the fitting, which connects to the fitting in an impact-resistant manner, which can resist the forces incurred when subjected to loading from on-deck vehicles and equipment, which provides a long lasting watertight seal of the socket cavity, and which provides a substantially planar cover plate.

SUMMARY OF THE INVENTION

The present invention, which addresses the needs of the prior art, provides a cover assembly for a cargo lashing fitting. The cover assembly includes a substantially planar cover plate having an inner surface and an outer surface. The inner surface defines an inner side and the outer surface defines an outer side. The cover assembly further includes anti-rotation structure secured to the inside surface of the cover plate and positioned to engage the fitting when the cover plate is located thereon, thereby limiting rotation of the cover plate with respect to the fitting. The cover assembly also includes at least two clamping surfaces located on the inner side of the cover plate and spaced a preselected distance therefrom. Each of the clamping surfaces is rotatable between an unlocked position which allows location of the cover plate on the fitting and a locked position which secures the cover plate to the fitting. Finally, the cover assembly includes at least one turning head located on the outer side of the cover plate. The at least one turning head mechanically communicates with the clamping surfaces to rotate each of the clamping surfaces between the unlocked position and the locked position.

As a result, the present invention provides a cover assembly for a cargo lashing fitting having a substantially planar cover plate which can be readily installed/uninstalled to and from the fitting, which connects to the fitting in an impact-resistant manner, which can resist the forces incurred when subjected to loading from on-deck vehicles and equipment, and which provides a long lasting watertight seal of the socket cavity.

BRIEF DESCRIPTION OF THE DRAWINGS

FIG. 3 is a bottom view of the assembled cover assembly of FIG. 2;

FIG. 3a is a cross-sectional view taken along lines A-A of FIG. 3;

FIGS. 4a to 4d show installation of the cover assembly of FIG. 2 to a cloverleaf lashing socket;

FIG. 11 is a top plan view of the assembled cover assembly of FIG. 10;

FIG. 11a is a bottom plan view of the assembled cover of FIG. 10;

FIG. 11b is a cross-sectional view taken along lines A-A of FIG. 11;

DETAILED DESCRIPTION OF THE INVENTION

Figure 1B:
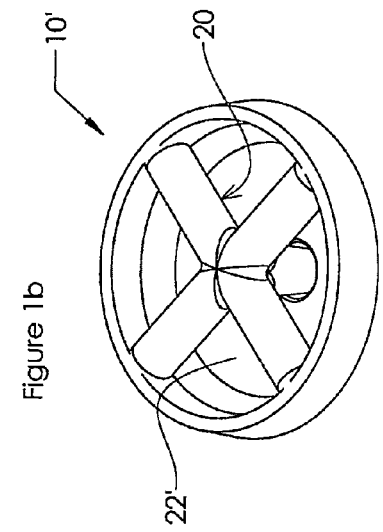
FIG. 1b is a perspective view of a typical crossbar lashing socket.
Figure 1A:
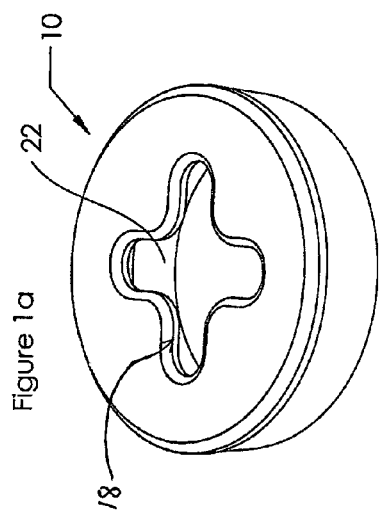
FIG. 1a is a perspective view of a typical cloverleaf lashing socket.

A typical prior art cloverleaf-type lashing socket, i.e., socket 10, is shown in FIG. 1a, while a typical prior art crossbar-type lashing socket, i.e., socket 10', is shown in FIG. 1b. As will be appreciated by those skilled in the art, and as shown in FIG. 1c, sockets 10 and 10' are installed in a deck 12 of a transportation vehicle, e.g., a ship, railcar, etc. The sockets are typically installed to be substantially flush with the deck of the vehicle, but in certain applications can be installed above the deck surface. Lashing gear 14 extends between a cargo item 16 and the lashing socket installed in deck 12. Those skilled in the art will understand that certain types of lashing gear are configured to engage with cloverleaf-shaped opening 18 formed in socket 10, while other types of lashing gear are configured to engage with crossbars 20 of socket 10'. The different lashing sockets are suitable/preferred for different applications. As shown, lashing socket 10 defines an interior cavity 22, while lashing socket 10' defines an interior cavity 22', both of which can in certain applications, collect water, as well as other fluids and debris, therein.

Figure 1D:
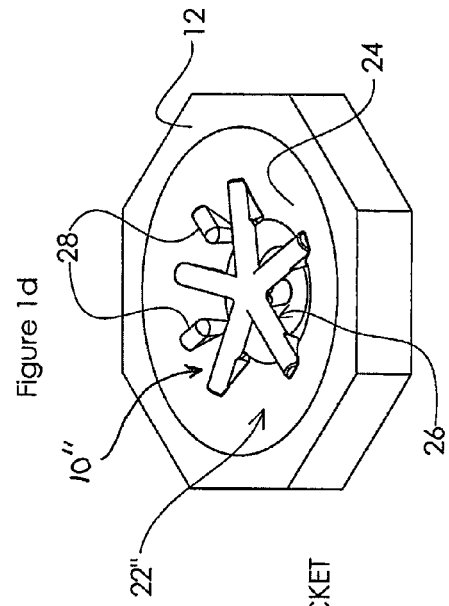
FIG. 1d is a perspective view of a typical 5-bar lashing socket.
Figure 1C:
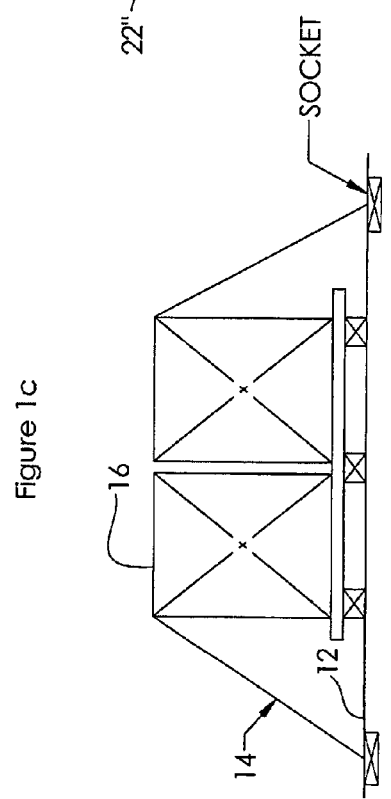
FIG. 1c is a view of an item of cargo secured to the deck of a transportation vehicle.
Figure 2:
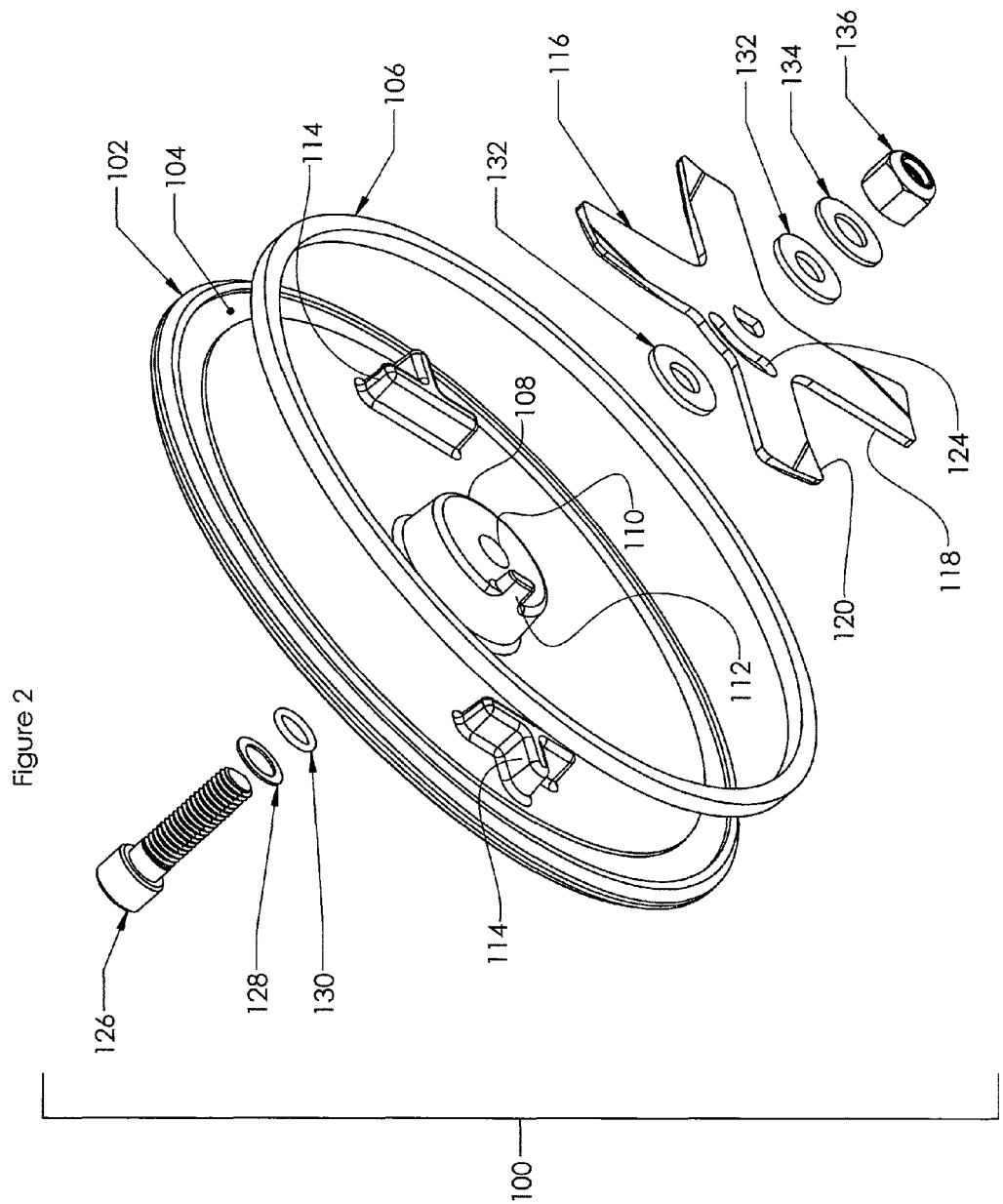
FIG. 2 is an exploded perspective view of a first embodiment of the present invention suitable for engagement with a typical cloverleaf lashing socket.

Another prior art lashing socket, i.e., 5-bar lashing socket 10", is shown in FIG. 1*d*. A 5-bar lashing socket is typically integrated into deck 12 of the transportation vehicle by first forming a dimple 24 in deck 12, and thereafter welding a 5-bar member 26 within the dimple. Like socket 10 and socket 10', lashing socket 10" defines an interior cavity 22", which can collect water, as well as other fluids and debris, therein. In certain applications, a pair of obstructions 28 may be installed within dimple 24 and located to block hook access to the 5-bar member from pre-selected directions. Those skilled in the art will understand that 5-bar lashing sockets are oftentimes installed within the deck of an aircraft carrier, and the stowage location of aircraft/equipment on the surface of the deck is generally predetermined. As such, the preferred orientation of the lashing gear is known. Obstructions 28 facilitate proper lashing by ensuring that the lashing hook is oriented in the preferred direction.

A first embodiment of the present invention, i.e., cover assembly 100, is shown in FIGS. 2 to 5. Cover assembly 100 is designed and configured for engagement with a cloverleaf-type lashing socket, e.g., socket 10. More particularly, cover assembly 100 includes a cover plate 102 having a substantially planar outer surface 103 and a diameter $D_1$ substantially equal to the diameter of socket 10. Of course, there may be applications where the diameter of the cover plate is selected to be greater than or less than the diameter of socket 10. The substantially planar configuration of outer surface 103 reduces/eliminates areas on the cover which can collect water/debris, and also facilitates movement of equipment/persons across the surface of the deck when the cover is installed. Plate 102 preferably includes a circular groove 104 sized to receive a sealing ring 106. Centrally located on the inside surface of plate 102 is a boss 108. Boss 108 includes an aperture 110 extending therethrough and a stop 112. Also located on the inside surface of cover plate 102 are a pair of anti-rotation blocks 114. Cover assembly 100 further includes a cross-shaped clamping element 116, having four locking arms 118. As will be explained further hereinbelow, each locking arm preferably includes a ramped leading edge 120. Clamping element 116 further includes a central aperture 122, and an arcuate-shaped opening 124. In one preferred embodiment, cover assembly 100 further includes a bolt 126, a washer 128, an O-ring 130, elastomeric washers 132, a washer 134, and a nut 136.

Cover assembly 100 is shown in its assembled state in FIGS. 3 to 3*a*. As shown, bolt 126 extends through washer 128, through O-ring 130, through aperture 110 formed in cover plate 102, through washer 132, through clamping element 116, through washer 132, and through washer 134, before engaging nut 136. Of course, it is contemplated herein that clamping element 116 can be rotatably secured to the cover plate with other known mechanical fasteners. One of the novel features of the cover assembly of the present invention is that the cover assembly remains in its assembled state during both use and nonuse. In other words, once assembled, there is no need to disengage nut 136 from bolt 126. As a result, there are no loose/multiple parts to be handled during installation/removal of the cover assembly to a deck socket.

The installation of cover assembly 100 to socket 10 is best illustrated in FIGS. 4*a* to 4*d*. To begin (as shown in FIG. 4*a*), a tool 138, e.g., a hex wrench, is used to engage bolt 126, and thereafter rotate clamping element 116 to the unlocked position. In this regard, bolt 126 preferably includes a hex head 140. Of course, other bolt/tool arrangements could be utilized in the present invention. Referring now to FIG. 4*b*, it can be seen that two of the locking arms of clamping element 116 are aligned with anti-rotation blocks 114 when cover assembly 100 is in the unlocked position. As a result, cover plate 102 can be positioned over socket 10 such that anti-rotation blocks 114 extend within cloverleaf-shaped opening 18, while clamping element 116 extends through cloverleaf-shaped opening 18. Thus, the design of cover 102 provides a planar outer surface, while also providing interior structure (i.e., blocks 114) which prevents rotation of the cover plate with respect to socket 10. As is also best seen in FIG. 4*b*, stop 112 is engaged with one end of arcuate-shaped opening 124.

Once cover plate 102 is positioned over socket 10, the installer turns tool 138, thereby rotating clamping element 116 in the counterclockwise direction (when viewed in FIG. 4*b*). Clamping element 116 is allowed to rotate approximately 45° before stop 112 engages the opposite end of arcuate-shaped opening 124. The ability to rotate the clamping element through approximately 45° of rotation results in each of the locking arms being positioned approximately equidistant from the nearest cloverleaf opening (see FIG. 4*d*), thus decreasing the likelihood of the clamping element backing off and/or being jarred loose. At this point, no further rotation of clamping element 116 may be accomplished because blocks 114, which engage cloverleaf shaped opening 18, prevent any rotation of cover plate 102 with respect to socket 10. Anti-rotation blocks 114 can be seen engaged with cloverleaf-shaped opening 18 in FIG. 4*d*.

Figure 5:
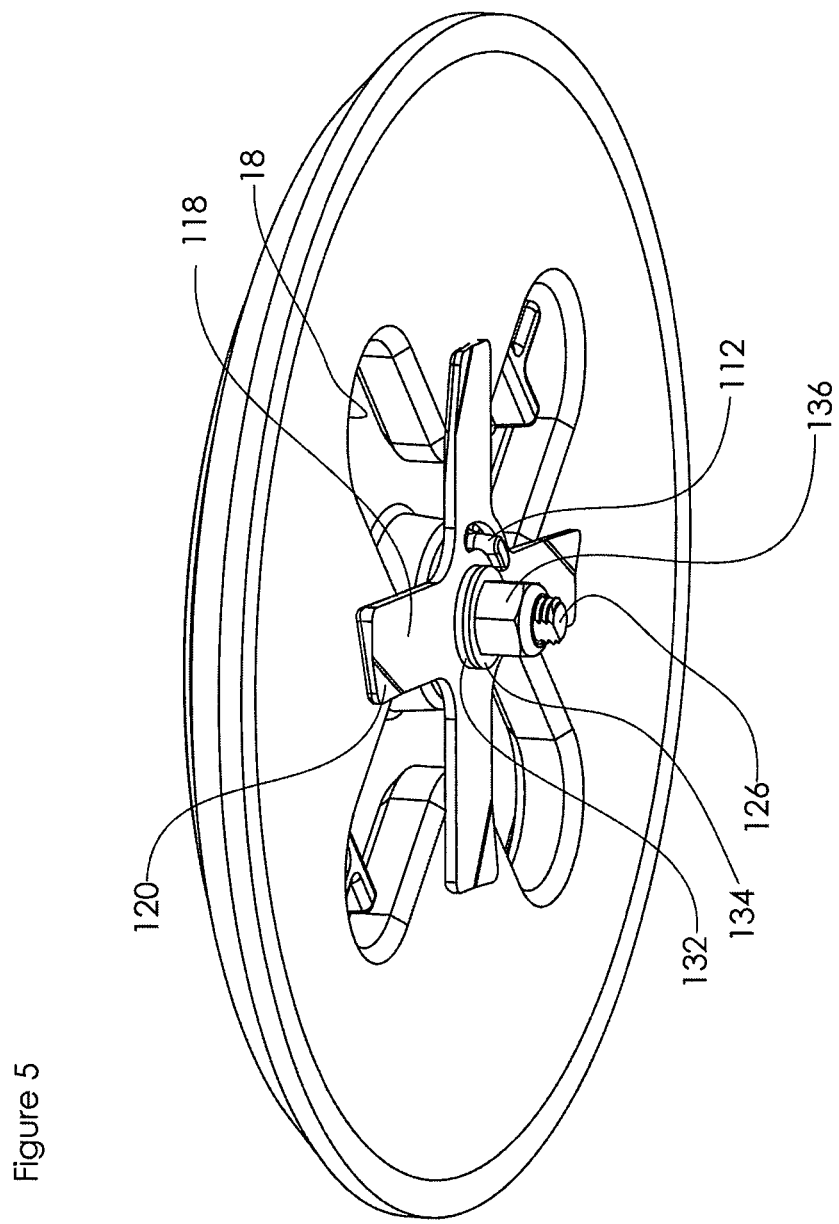
FIG. 5 is an enlarged detail showing the ramped leading edge of one of the locking arms of the cover assembly of FIG. 2 during installation of the cover assembly to a cloverleaf lashing socket.
Figure 6:
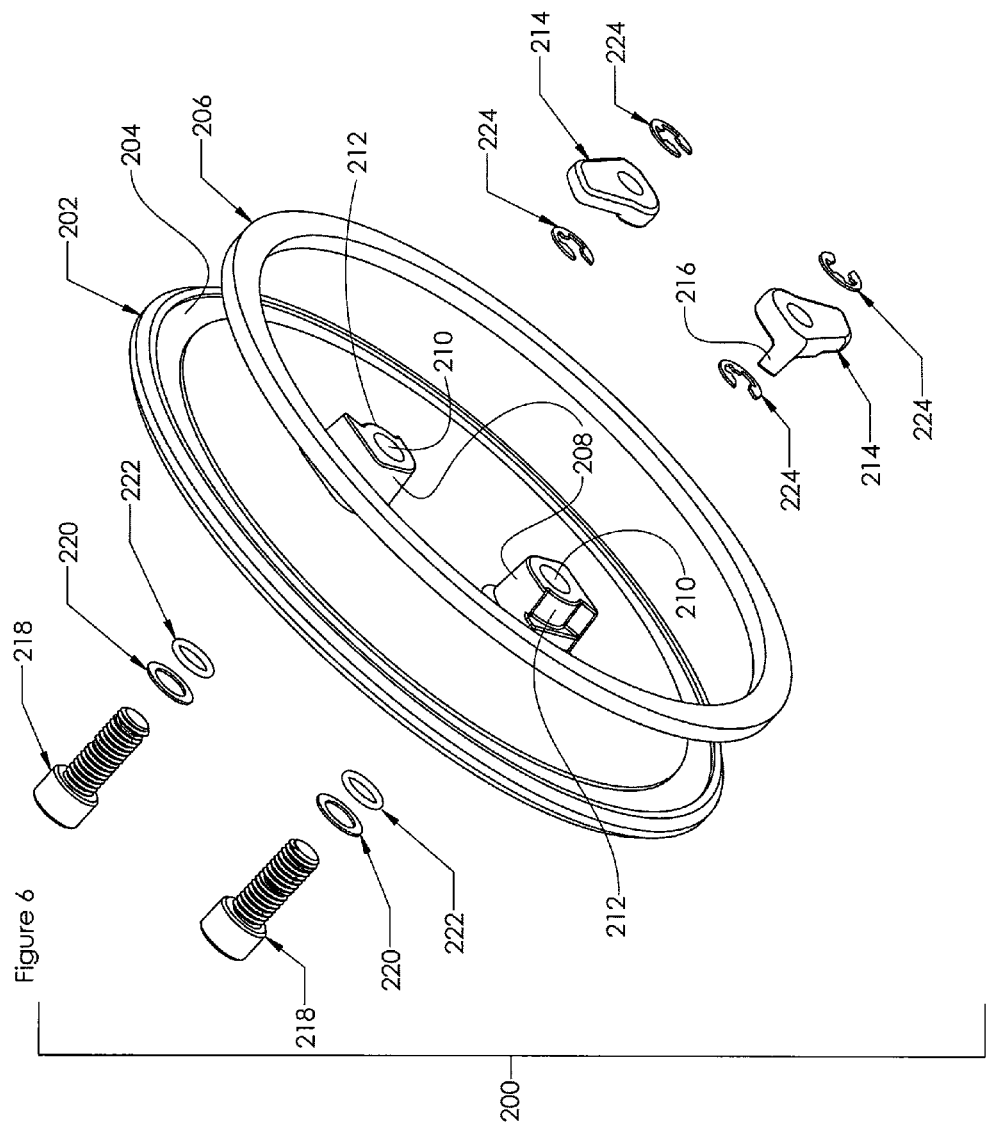
FIG. 6 is an exploded perspective view of a second embodiment of the present invention suitable for engagement with a typical crossbar lashing socket.

The novel design of clamping element 116 both facilitates rotation of the clamping element, while at the same time drawing cover plate 102 tightly against socket 10. This of course applies pressure to sealing ring 106, thereby ensuring that cloverleaf-shaped opening 18 is sealed against any ingress of water, moisture and/or other fluids and debris. More particularly, each of locking arms 118 is preferably formed with a ramped leading edge 120. As best illustrated in FIG. 5, each of the ramped leading edges engage the underside of socket 10, thereby facilitating rotation of clamping element 116 from the unlocked position to the locked position. As will be understood by reference to the drawings, as clamping element 116 is rotated, the ramped surfaces will tend to draw the clamping element downward into socket 10, thereby drawing cover plate 102 downward against the outside surface of socket 10, whereupon further rotation will allow contact surfaces 142 to frictionally engage the underside of socket 10. Of course, this exerts pressure on sealing ring 106 about the periphery of cover plate 102, ensuring a uniform and consistent seal between the cover plate and the lashing socket, even with sockets that have rough and uneven surfaces due to corrosion, paint, damage, etc. Moreover, the novel cross-shaped design of clamping element 116 provides four locking arms 118, which each engage a portion of the cloverleaf at 90° intervals, thus helping to ensure that the cover is drawn down evenly about an axis extending through bolt 126, ensuring that sealing ring 106 uniformly contacts the surface of the socket.

In one preferred embodiment, the locking arms of clamping element 116 are designed to flex, such that the locking arms (when moved to the locked position) are placed in a biased condition. This ensures that the cover assembly remains tightly sealed against the socket. This flexibility/springiness of the arms can result from a combination of material selection, configuration, cross-sectional dimensions, or others such design criteria. In one preferred installation method, a misting oil is applied to the inside of cover assembly 100 to prevent/reduce any corrosion due to moisture trapped within the socket after installation. In a further effort to prevent/reduce corrosion, the components can also be coated and/or manufactured from a corrosion-resistant material, e.g., stainless steel.

A second embodiment of the present invention, i.e., cover assembly 200, is shown in FIGS. 6 to 9. Cover assembly 200 is designed and configured for engagement with a crossbar-type lashing socket, e.g., socket 10'. Cover assembly 200 includes a cover plate 202 having a substantially planar outer surface 203 and a diameter $D_2$ greater than the diameter of socket 10'. Of course, there may be applications where the diameter of the cover plate is selected to be substantially equal to the diameter of socket 10'. The substantially planar configuration of outer surface 203 reduces/eliminates areas on the cover which can collect water/debris, and also facilitates movement of equipment/persons across the surface of the deck when the cover is installed. Cover plate 202 preferably includes a circular groove 204 sized to receive a sealing ring 206. A pair of bosses 208 are located on the inside surface of cover plate 202. Each of the bosses includes an aperture 210 extending therethrough and a guide path 212. Cover assembly 200 further includes a pair of clamping lugs 214, which as explained further hereinbelow, can be rotated between a locked position and an unlocked position. Each clamping lug 214 includes a shoulder 216 sized and configured to engage guide paths 212. In one preferred embodiment, each clamping lug 214 is secured to the cover plate via a bolt 218, a washer 220, an O-ring 222 and a pair of retaining rings 224. Of course, it is contemplated herein that clamping lugs 214 can be rotatably secured to the cover plate with other known mechanical fasteners.

Figure 7A:
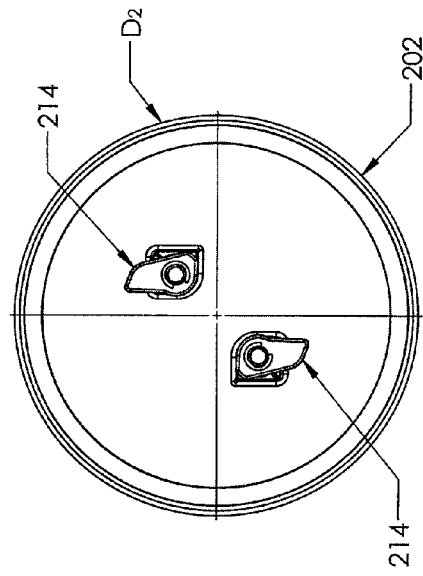
FIG. 7a is a bottom plan view of the assembled cover of FIG. 6.
Figure 7:
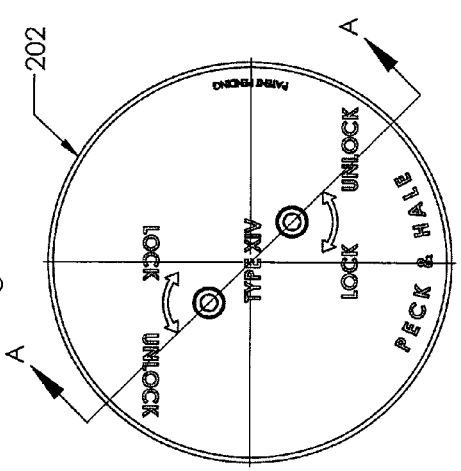
FIG. 7 is a top plan view of the assembled cover assembly of FIG. 6.
Figure 7B:
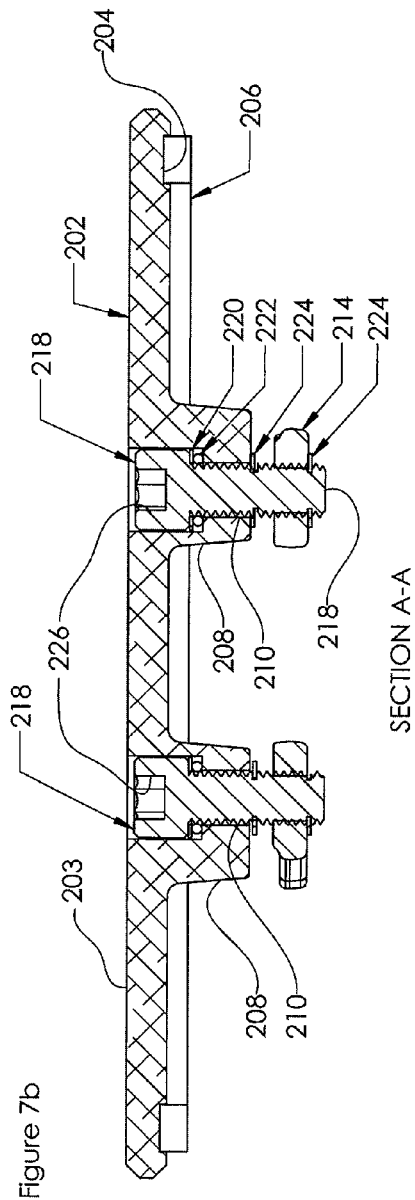
FIG. 7b is a cross-sectional view taken along lines A-A of FIG. 7.

Cover assembly 200 is shown in its assembled state in FIGS. 7 to 7b. As shown, bolts 218 extend through washers 220, through O-rings 222, through apertures 210 formed in bosses 208, through retaining rings 224, through clamping bars 214, and finally through retaining rings 224. Like cover assembly 100, cover assembly 200 remains in its assembled state during both use and nonuse. In other words, once assembled, there is no need to disengage the clamping bars from the cover plate. As a result, there are no loose/multiple parts to be handled during installation/removal of the cover assembly to a deck socket.

Figure 8:
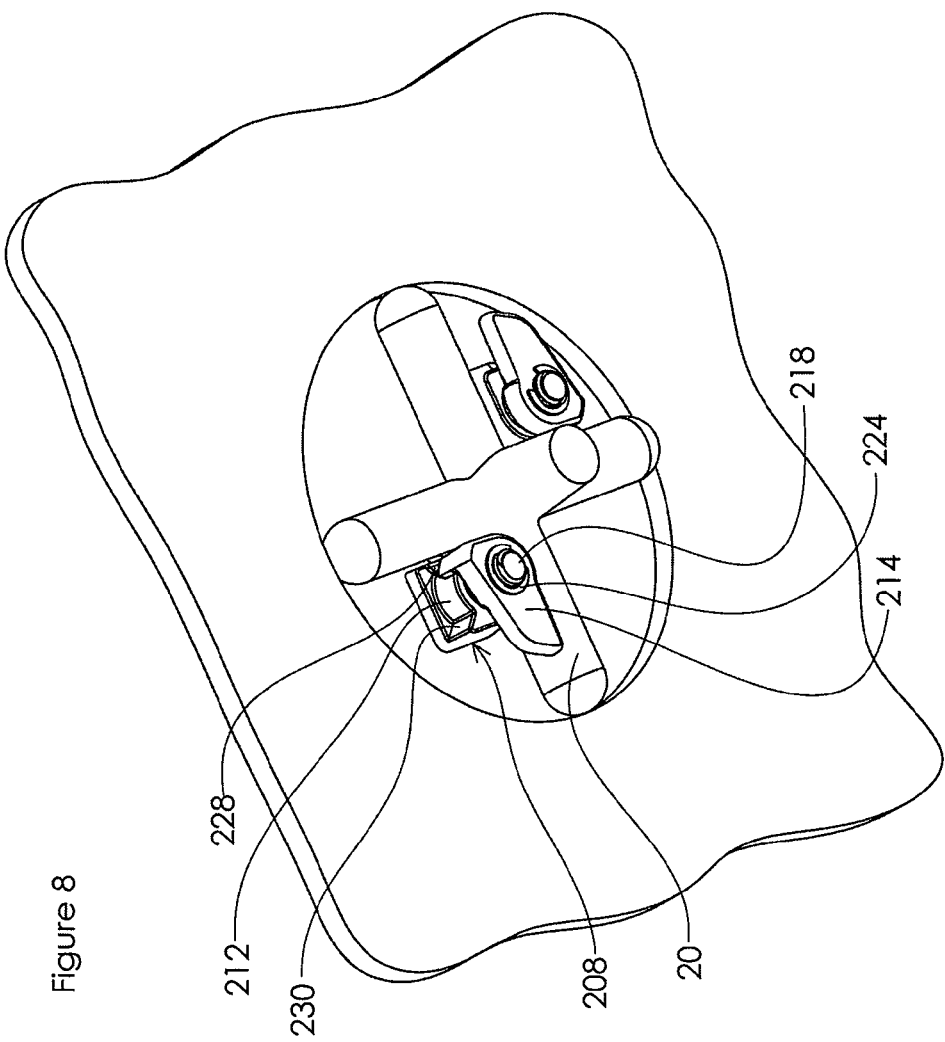
FIG. 8 is an enlarged detail showing one of the clamping lugs of the cover assembly of FIG. 6 in the unlocked position when the cover assembly is positioned over a crossbar lashing socket.
Figure 9:
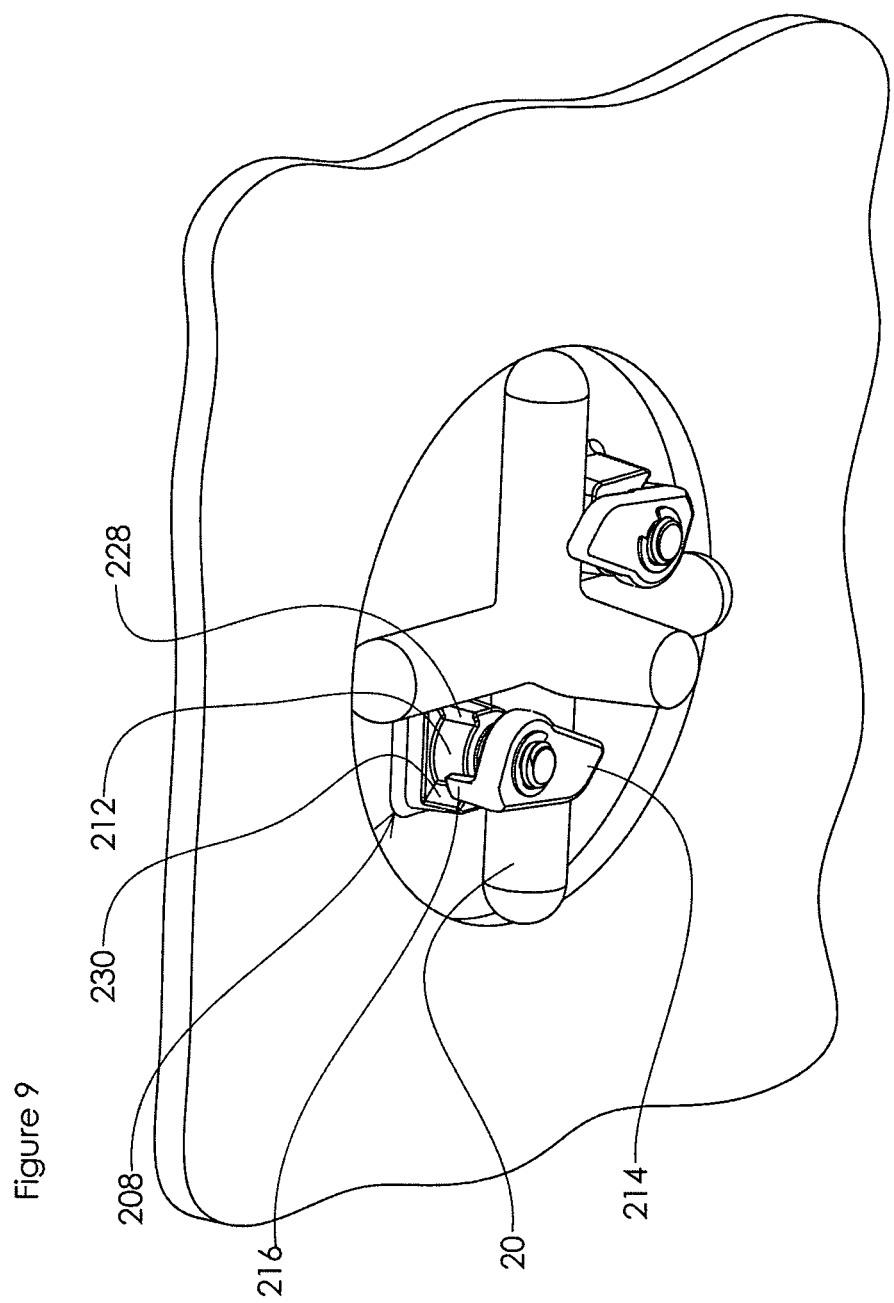
FIG. 9 is an enlarged detail showing the clamping lug of FIG. 8 in the locked position
Figure 10:
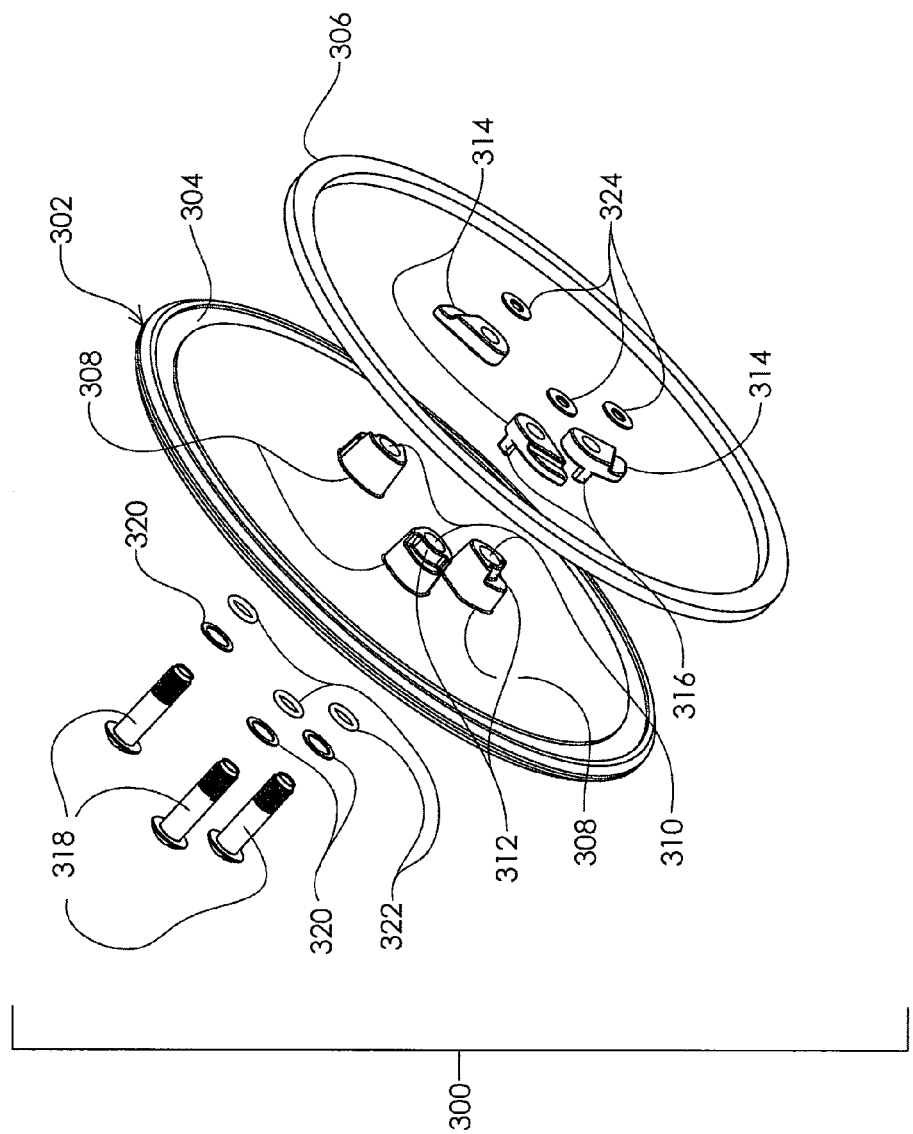
FIG. 10 is an exploded perspective view of a third embodiment of the present invention suitable for engagement with a typical 5-bar lashing socket.

Bolts 218 preferably include a head 226 configured to engage a tool. In one preferred embodiment, head 226 is provided with a hex fitting capable of being engaged by a hex wrench. Referring to FIG. 7a, prior to installation of cover assembly 200, the tool is used to rotate each of the clamping lugs to the unlocked position. Cover plate 202 may then be positioned over socket 10'. As best seen in FIG. 8, bosses 208 fit between and preferably engage crossbars 20. The engagement of bosses 208 with crossbars 20 prevents rotation of cover plate 202 with respect to deck socket 10', in the same manner that anti-rotation blocks 114 prevents rotation of cover plate 102 with respect to socket 10. Thus, the design of cover plate 202 provides a planar outer surface, while also providing interior structure (i.e., bosses 208) which prevents rotation of the cover plate with respect to socket 10'. When in its unlocked position, shoulder 216 of clamping lug 214 engages a first stop 228 located on one side of guide path 212 (see FIG. 8). As bolt 218 is rotated to the locked position, clamping lug 214 rotates clockwise (as viewed in FIG. 8), and engages crossbar 20. More particularly, clamping lug 214 is rotated (see FIG. 9) until shoulder 216 contacts second stop 230 located on the other side of guide path 212. This rotation is preferably in the range of from about 45° to 180°, more preferably from about 80° to 110°. In one preferred embodiment, the clamping lugs are configured to rotate approximately 90°. Inasmuch as bosses 208 are engaged with crossbars 20, no further rotation of clamping bars 214 can be accomplished. The rotation of clamping lugs 214 to the locked position draws cover plate 202 downward towards the surface of socket 10'. This of course applies pressure to sealing ring 206, thereby ensuring that socket 10' is sealed against any ingress of water, moisture and/or other fluids and debris. The present design takes advantage of the circular cross-section of the crossbars in socket 10. Like the ramped leading edges discussed hereinabove, the circular crossbars tend to guide the lugs thereunder as the lugs are rotated, while at the same time drawing the cover plate downward to help achieve proper clamping and sealing, even with sockets that have rough and uneven surfaces due to corrosion, paint, damage, etc.

In one preferred installation method, a misting oil is applied to the inside of cover assembly 200 to prevent/reduce any corrosion due to moisture trapped within the socket after installation. In a further effort to prevent/reduce corrosion, the components can also be coated and/or manufactured from a corrosion-resistant material, e.g., stainless steel.

A third embodiment of the present invention, i.e., cover assembly 300, is shown in FIGS. 10 to 13. Cover assembly 300 is designed and configured for engagement with a 5-bar lashing socket, e.g., socket 10". Cover assembly 300 includes a cover plate 302 having a substantially planar outer surface 303 and a diameter $D_3$ greater than the diameter of dimple 24. Of course, there may be applications where the diameter of the cover plate is selected to be substantially equal to the diameter of dimple 24. The substantially planar configuration of outer surface 303 reduces/eliminates areas on the cover which can collect water/debris, and also facilitates movement of equipment/persons across the surface of the deck when the cover is installed. Cover plate 302 preferably includes a circular groove 304 sized to receive a sealing ring 306. Three bosses 308 are located on the inside surface of cover plate 302. Each of the bosses includes an aperture 310 extending therethrough and a guide path 312. Cover assembly 300 further includes three clamping lugs 314, which as explained further hereinbelow, can be rotated between a locked position and an unlocked position. The individual bars of 5-bar member 26 are typically located at 72° intervals. Accordingly, the configuration of 5-bar member 26 does not allow two clamping members to be installed 180° apart from each other. The inclusion of the third clamping lug ensures that cover plate is drawn down evenly against the deck and is not installed in a cocked position, which ensures that the seal is fully engaged around the entire periphery of the cover plate and that such cover plate is securely engaged with socket 10". Each clamping lug 314 includes a shoulder 316 sized and configured to engage guide paths 312. In one preferred embodiment, each clamping lug 314 is secured to the cover plate via a bolt 318, a washer 320, an O-ring 322 and a washer 324. After assembly, the bottom end of bolt 318 is deformed to provide a stop 325, which captures the lug thereon. Of course, it is contemplated herein that clamping lugs 314 can be rotatably secured to the cover plate with other known mechanical fasteners, including the bolts and retaining rings discussed hereinabove with respect to cover assembly 200.

Cover assembly 300 is shown in its assembled state in FIGS. 11 to 11b. As shown, bolts 318 extend through washers 320, through O-rings 322, through apertures 310 formed in bosses 308, through clamping bars 314, and finally through washers 324. The deformed bottom ends of bolt 318, i.e., stops 325, retain the clamping bars on the bolts. Like cover assemblies 100 and 200, cover assembly 300 remains in its assembled state during both use and nonuse. As a result, there are no loose/multiple parts to be handled during installation/removal of the cover assembly to a deck socket.

Figure 12:
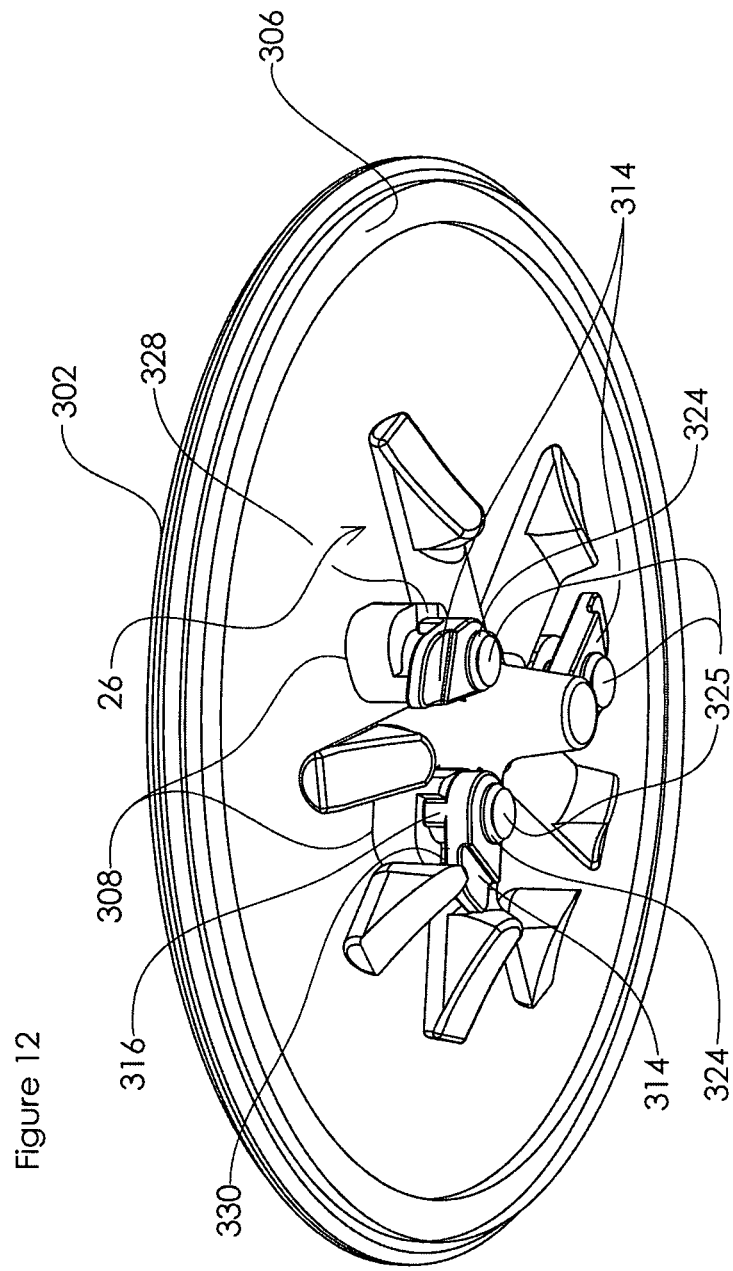
FIG. 12 is an enlarged detail showing the clamping lugs of the cover assembly of FIG. 10 in the unlocked position when the cover assembly is positioned over a 5-bar lashing socket.
Figure 13:
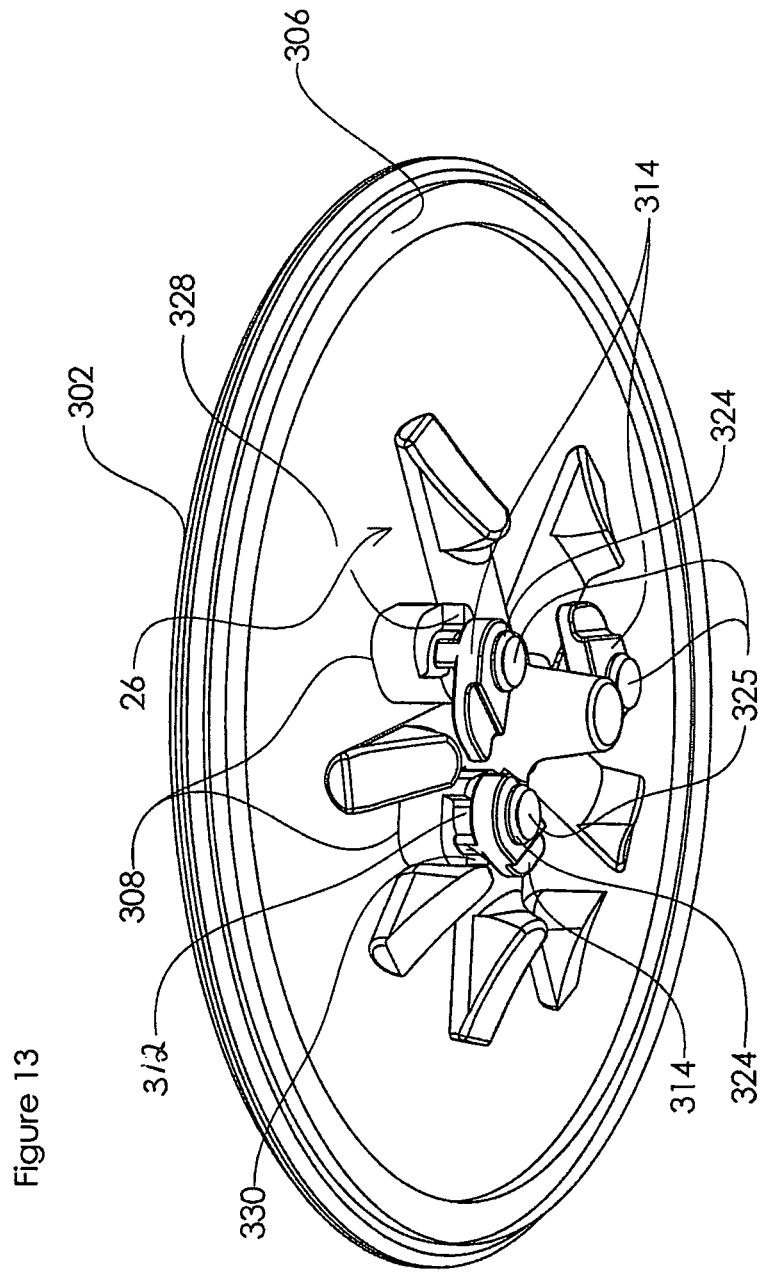
FIG. 13 is an enlarged detail showing the clamping lugs of FIG. 12 in the locked position.

Bolts 318 preferably include a head 326 configured to engage an installation tool. In one preferred embodiment, head 326 is formed with a dome-shaped cross-section and is provided with cross-slots 327 capable of being engaged by the installation tool. The combination of the dome-shaped cross-section and cross-slots ensures that fluid does not become captured in the head of the bolt, thus hindering removal of the cover plate, e.g., by freezing in cold environments. Prior to installation of cover assembly 300, the tool is used to rotate each of the clamping lugs to the unlocked position. Cover plate 302 may then be positioned over socket 10". As best seen in FIG. 12, bosses 308 fit between and preferably engage the bars of 5-bar member 26. The engagement of bosses 308 with the individual bars prevents rotation of cover plate 302 with respect to socket 10", in the same manner that anti-rotation blocks 114 prevents rotation of cover plate 102 with respect to socket 10. Thus, the design of cover plate 302 provides a planar outer surface, while also providing interior structure (i.e., bosses 308) which prevent rotation of the cover plate with respect to socket 10". When in its unlocked position, shoulder 316 of clamping lug 314 engages a first stop 328 located on one side of guide path 312 (see FIG. 12). As bolt 318 is rotated to the locked position, clamping lug 314 rotates counterclockwise (as viewed in FIG. 12), and engages 5-bar member 26. More particularly, clamping lug 314 is rotated (see FIG. 13) until shoulder 316 contacts second stop 330 located on the other side of guide path 312. This rotation is preferably in the range of from about 45° to 180°, more preferably from about 80° to 110°. In one preferred embodiment, the clamping lugs are configured to rotate approximately 90°. Inasmuch as bosses 308 are engaged with 5-bar member 26, no further rotation of clamping bars 314 can be accomplished. The rotation of clamping lugs 314 to the locked position draws cover plate 302 downward towards the surface of socket 10". This of course applies pressure to sealing ring 306, thereby ensuring that socket 10" is sealed against any ingress of water, moisture and/or other fluids and debris. The present design takes advantage of the circular cross-section of the bars of 5-bar member 26. Like the ramped leading edges discussed hereinabove, the circular bars tend to guide the lugs thereunder as the lugs are rotated, while at the same time drawing the cover plate downward to help achieve proper clamping and sealing, even with sockets that have rough and uneven surfaces due to corrosion, paint, damage, etc.

In one preferred installation method, a misting oil is applied to the inside of cover assembly 300 to prevent/reduce any corrosion due to moisture trapped within the socket after installation. In a further effort to prevent/reduce corrosion, the components can also be coated and/or manufactured from a corrosion-resistant material, e.g., stainless steel.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A cover for a cargo lashing fitting, comprising:
    a substantially planar cover plate having an inner surface and an outer surface, said inner surface defining an inner side and said outer surface defining an outer side;
    anti-rotation structure secured to said inner surface of said cover plate and positioned to engage said fitting when said cover plate is located thereon thereby limiting rotation of said cover plate with respect to said fitting;
    at least two clamping surfaces located on said inner side of said cover plate and spaced a preselected distance therefrom, each of said clamping surfaces being rotatable between an unlocked position which allows location of said cover plate on said fitting and a locked position which secures said cover plate to said fitting; and
    at least one turning head located on said outer side of said cover plate, said at least one turning head mechanically communicating with said clamping surfaces to rotate each of said clamping surfaces between said unlocked position and said locked position.

2. A cover assembly for engagement with a lashing socket, said socket defining a diameter D, comprising:
    a substantially planar cover plate having an inner surface and an outer surface, said inner surface defining an inner side and said outer surface defining an outer side;
    at least two anti-rotation blocks secured to said inner surface of said plate and positioned to engage said socket when said cover plate is located thereon thereby limiting rotation of said plate with respect to said socket;
    a boss secured to and extending from said inner surface of said cover plate, said boss being centrally positioned thereon;
    a cross-shaped clamping element having four locking arms, said clamping element being rotatably secured to said boss such that said locking arms are spaced a preselected distance from said inner side of said plate, each of said locking arms being rotatable between an unlocked position which allows location of said cover plate on said socket and a locked position which secures said cover plate to said socket; and
    at least one turning head located on said outer side of said cover plate, said at least one turning head mechanically communicating with said clamping element to rotate each of said locking arms between said unlocked position and said locked position.

3. The cover assembly according to claim 2, wherein said boss includes a centrally-located aperture and a stop extending from one surface thereof;
    wherein said clamping element includes a centrally-located aperture and an arcuate-shaped opening; and
    wherein said stop extends through said arcuate-shaped opening.

4. The cover assembly according to claim 3, wherein said arcuate-shaped opening defines an arc of approximately 45° thereby limiting rotation of said clamping element to approximately 45°.

5. The cover assembly according to claim 3, wherein each of said locking arms includes a ramped leading edge to facilitate engagement with said socket and to uniformly draw said cover plate against said socket.

6. The cover assembly according to claim 3, wherein said inner surface of said cover plate includes a circular groove extending about the periphery thereof; and
    further comprising a sealing ring sized for receipt within said groove whereby a watertight seal is formed between said cover plate and said socket when said locking arms are rotated from said unlocked position to said locked position.

7. The cover assembly according to claim 6, further comprising mechanical hardware extending through said cover to rotatably secure said clamping element to said boss.

8. The cover assembly according to claim 7, wherein said mechanical hardware maintains securement of said clamping element to said boss in both said unlocked and locked positions.

9. The cover assembly according to claim 8, wherein said turning head is provided on said hardware.

10. The cover assembly according to claim 8, wherein said mechanical hardware includes a bolt extending through said cover plate and through said boss, and wherein said turning head is located on said bolt.

11. The cover assembly according to claim 9, wherein said cover plate has a diameter $D_1$, and wherein $D_1$ is substantially equal to D.

12. A cover assembly for engagement with a lashing socket, said socket defining a diameter D, comprising:
- a substantially planar cover plate having an inner surface and an outer surface, said inner surface defining an inner side and said outer surface defining an outer side;
- at least two bosses secured to and extending from said inner surface of said cover plate, said bosses being positioned to engage said socket when said cover plate is located thereon thereby limiting rotation of said plate with respect to said socket;
- at least two clamping lugs located on said inner side of said plate and rotatably secured to said bosses, each of said clamping lugs being rotatable between an unlocked position which allows location of said cover plate on said socket and a locked position which secures said cover plate to said socket; and
- at least one turning head located on said outer side of said cover, said at least one turning head mechanically communicating with said clamping lugs to rotate each of said clamping lugs between said unlocked position and said locked position.

13. The cover assembly according to claim 12, wherein each of said bosses includes a centrally-located aperture extending therethrough and a guide path formed thereon; and wherein each of said clamping lugs includes a shoulder extending therefrom, said shoulder being sized and located to engage said guide path.

14. The cover assembly according to claim 13, wherein each guide path extends between a first stop and a second stop, said first and second stops defining an arc of approximately 45° to 180° for limiting rotation of said clamping lugs to approximately 45° to 180°.

15. The cover assembly according to claim 14, wherein each guide path extends between a first stop and a second stop, said first and second stops defining an arc of approximately 80° to 110° for limiting rotation of said clamping lugs to approximately 80° to 110°.

16. The cover assembly according to claim 14, wherein said inner surface of said cover plate includes a circular groove extending about the periphery thereof; and
- further comprising a sealing ring sized for receipt within said groove whereby a watertight seal is formed between said cover plate and said socket when said locking arms are rotated from said unlocked position to said locked position.

17. The cover assembly according to claim 16, further comprising mechanical hardware extending through said cover to rotatably secure said clamping lugs to said bosses.

18. The cover assembly according to claim 17, wherein said mechanical hardware maintains securement of said clamping lugs to said bosses in both said unlocked and locked positions.

19. The cover assembly according to claim 18, wherein said turning heads are provided on said hardware.

20. The cover assembly according to claim 18, wherein said mechanical hardware includes at least two bolts extending through said cover plate, and wherein said turning heads are located on said bolts.

21. The cover assembly according to claim 19, wherein said cover plate has a diameter $D_2$, and wherein $D_2$ is substantially equal to D.

22. The cover assembly according to claim 19, wherein said diameter D defines a dimple in said socket, and wherein said cover plate has a diameter $D_3$, and wherein said diameter $D_3$ is greater than said diameter D.

* * * * *